(12) United States Patent
Gassaway et al.

(10) Patent No.: US 9,136,687 B2
(45) Date of Patent: Sep. 15, 2015

(54) LOW FRICTION SLEEVE FOR COLD SHRINK TUBE

(71) Applicant: 3M INNOVATIVE PROPERTIES COMPANY, St. Paul, MN (US)

(72) Inventors: Kevin L. Gassaway, Cedar Park, TX (US); William L. Taylor, Round Rock, TX (US); Carl J. Wentzel, Austin, TX (US); Kim P. Mulvey, Georgetown, TX (US); James B. Nickerson, Cedar Park, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 164 days.

(21) Appl. No.: 13/715,594

(22) Filed: Dec. 14, 2012

(65) Prior Publication Data

US 2013/0183464 A1      Jul. 18, 2013

Related U.S. Application Data

(60) Provisional application No. 61/577,974, filed on Dec. 20, 2011.

(51) Int. Cl.
  *B32B 1/08* (2006.01)
  *H02G 15/18* (2006.01)
  *F16L 57/00* (2006.01)

(52) U.S. Cl.
  CPC *H02G 15/18* (2013.01); *B32B 1/08* (2013.01); *F16L 57/00* (2013.01); *H02G 15/1826* (2013.01); *Y10T 29/49863* (2015.01); *Y10T 428/1328* (2015.01); *Y10T 428/1334* (2015.01)

(58) Field of Classification Search
  CPC ................................. B32B 1/08; B32B 23/00
  USPC ............ 428/34.1, 34.2, 35.7, 35.9, 36.9, 34.9
  See application file for complete search history.

(56) References Cited

U.S. PATENT DOCUMENTS

| 3,515,798 A | 6/1970 | Sievert |
| 4,049,767 A | 9/1977 | Vaidya |
| 4,506,430 A | 3/1985 | Guzay |
| 4,685,189 A | 8/1987 | Palmqvist et al. |

(Continued)

FOREIGN PATENT DOCUMENTS

| EP | 0209399 | 1/1987 |
| EP | 0784178 | 7/1997 |

(Continued)

OTHER PUBLICATIONS

PCT/US2012/069984, International Search Report, Aug. 6, 2013.

*Primary Examiner* — Marc Patterson
(74) *Attorney, Agent, or Firm* — Gregg H. Rosenblatt

(57) ABSTRACT

Provided is an article comprising a flexible tube having an inner surface, an outer surface, a first end and a second end, the inner surface at least partially covered with a low friction material. Also provided is an article comprising a cold shrinkable sleeve disposed on a tubular support core in a stretched condition, at least a portion of the cold shrinkable sleeve folded such that at least one portion of the cold shrinkable sleeve overlaps another portion of the cold shrinkable sleeve, wherein a flexible tube having an inner surface, an outer surface, a first end and a second end, the inner surface at least partially covered with a low friction material, is positioned between the overlapping portions of the cold shrinkable sleeve.

16 Claims, 5 Drawing Sheets

(56) References Cited

U.S. PATENT DOCUMENTS

| | | |
|---|---|---|
| 5,098,752 A | 3/1992 | Chang et al. |
| 5,495,650 A | 3/1996 | Crepel |
| 5,753,861 A | 5/1998 | Hansen et al. |
| 2007/0053749 A1* | 3/2007 | Jarvis et al. ................ 405/154.1 |
| 2009/0199397 A1 | 8/2009 | Franxois |

FOREIGN PATENT DOCUMENTS

| | | |
|---|---|---|
| JP | S6423711 | 1/1989 |
| JP | S6423712 | 1/1989 |
| WO | WO 95/11542 | 4/1995 |
| WO | WO 01/86773 | 11/2001 |

* cited by examiner

LOW FRICTION SLEEVE FOR COLD SHRINK TUBE

CROSS REFERENCE TO RELATED APPLICATION

This application claims the benefit of U.S. Provisional Patent Application No. 61/577,974 filed Dec. 20, 2012

TECHNICAL FIELD

This invention relates to cold shrink tubes and their installation.

BACKGROUND

Elastomeric sleeves and removable support core assemblies are known in the art and are particularly useful in the electrical distribution industry where they are often used in splices and terminations for power cables.

U.S. Pat. No. 4,506,430 describes an applicator for a radially expanded sleeve. A hollow sleeve support holds a folded elastic sleeve in the expanded condition. A lubricating substance is applied between the outer and inner portions of the folded sleeve.

After the applicator is coaxially disposed with respect to an elongate object, a longitudinally directed force applied to the outer sleeve portion results in relative movement between the outer sleeve portion and the inner sleeve portion, thus removing the folded elastic sleeve from the support and applying it to the elongate object.

U.S. Pat. No. 5,098,752 describes a method for covering a substrate which includes holding an elastic sleeve in a radially expanded condition on a ribbed support and then sliding the elastic sleeve off the support onto the underlying substrate. The valleys between the ribs are filled with lubricant. The ends of the elastic sleeve on the support may be folded back. After removal of the support, the folded ends may then be slid over the underlying portions of the elastic sleeve.

U.S. Pat. No. 4,685,189 describes a sleeve of pliable, elastic material such as silicone rubber, intended to be turned inside out when being fitted onto a slender elongated core. The inside surface of the sleeve has densely located hollows which are filled with lubricant.

U.S. Pat. No. 5,753,861 describes a covering device for applying an elastic cover to an elongate object. The covering device includes a folded elastic sleeve having an inner sleeve portion and at least one coaxially disposed outer sleeve portion. The inner and outer sleeve portions are continuously joined at least at one circumferential edge. The folded elastic sleeve is positioned on a support that holds it in a radially stretched condition. Relative movement between the outer sleeve portion and the inner sleeve portion results in the outer sleeve portion moving and recovering onto the elongate object. A lubricating material is applied between the outer and inner sleeve portions to facilitate the relative movement of the outer sleeve portion.

SUMMARY

At least one embodiment of the present invention features an article comprising a flexible tube having an inner surface, an outer surface, a first end and a second end, the inner surface at least partially covered with a low friction material.

At least one embodiment of the present invention features an article comprising a cold shrinkable sleeve disposed on a tubular support core in a stretched condition, at least a portion of the cold shrinkable sleeve folded such that at least one portion of the cold shrinkable sleeve overlaps another portion of the cold shrinkable sleeve, wherein a flexible tube having an inner surface, an outer surface, a first end and a second end, the inner surface at least partially covered with a low friction material is positioned between the overlapping portions of the cold shrinkable sleeve.

At least one embodiment of the present invention features a method comprising disposing a cold shrinkable sleeve on a tubular support core in a stretched condition, positioning a flexible tube having an inner surface, an outer surface, a first end and a second end, the inner surface at least partially covered with a low friction material, around the cold shrinkable sleeve, and folding a portion of the cold shrinkable sleeve over the tube such that the tube is positioned between overlapping portions of the cold shrinkable sleeve and the outer surface of the flexible tube is in contact with the surface of the cold shrinkable sleeve.

An advantage of at least one embodiment of the present invention is that it provides a low friction material to assist in the installation of a folded back cold shrink sleeve without leaving residue that covers a substantial portion of the outer surface of the cold shrink sleeve.

The above summary of the present invention is not intended to describe each disclosed embodiment or every implementation of the present invention. The Figures and detailed description that follow below more particularly exemplify illustrative embodiments.

DETAILED DESCRIPTION

Figure 1:
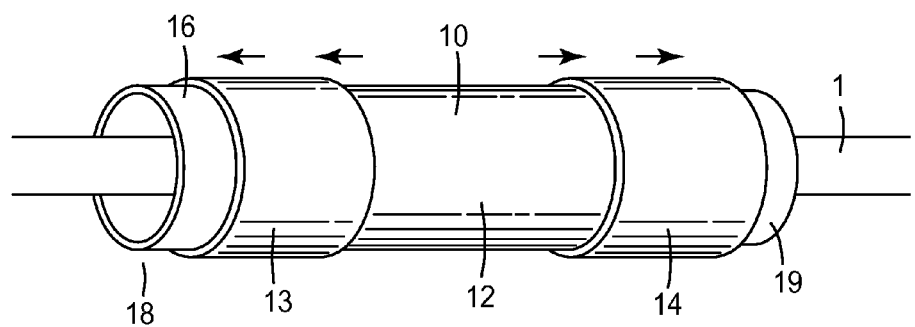
FIG. 1 depicts a prior art cold shrink device.

In the following description, reference is made to the accompanying set of drawings that form a part of the description hereof and in which are shown by way of illustration several specific embodiments. It is to be understood that other embodiments are contemplated and may be made without departing from the scope or spirit of the present invention. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The drawings are not to scale and certain dimensions and thicknesses in the drawings have been exaggerated for purposes of clarity.

Embodiments of the present invention relate to cold shrink elastomeric sleeves mounted on a support core in a highly stretched state and having a portion of the cold shrink sleeve folded back on itself, with a low friction sleeve beneath the folded back portion to facilitate unfolding the folded back portion during installation of the cold shrink elastomeric sleeve.

Some suitable materials for the elastic sleeve are described in U.S. Pat. No. 3,515,798, which is incorporated herein by reference. No restriction is anticipated on the chemical nature of the sleeve except that it must possess elasticity which allows it to be stretched significantly and then to shrink to substantially its original dimensions. Rubbery elastomers such as natural rubber, natural and synthetic polyisoprenes, cis-polybutadiene and styrene butadiene rubber, butadiene-acrylonitrile rubber, polychloroprene (neoprene), butyl rubber, polysulphide rubber, silicone rubber, urethane rubber, polyacrylate rubber, epichlorhydrin homo- and copolymer rubbers, propylene oxide rubber, fluorosilicone rubber, fluorocarbon rubber, chlorosulphonated polyethylene rubber, chlorinated polyethylene rubber, ethylene-propylene rubber, ethylene-propylene-diene monomer terpolymer rubber (EPDM), nitroso rubber or phosphonitrilic rubber may be suitable. Preferred materials are ethylene-propylene-diene monomer terpolymers (EPDM) and silicone rubbers. Any of the above materials may be formulated to a variety of compositions by including flame retardants, conductive materials, materials to improve weathering properties, materials to produce electrical stress grading properties, glass or carbon fibers, inert fillers, etc. In particular the elastic sleeve may be insulating, conductive or electrically stress grading as required for high voltage applications.

The elastic sleeve is preferably made from a material with a low permanent set. A permanent set of less than 30 percent is preferred. The material of the elastic sleeve is preferably stable and durable. It is preferred if the elastomeric material making up the sleeve is cross-linked. The elastic sleeve may be extruded or molded or fabricated from woven or knitted elastic fibers. The elastic sleeves according to the invention may also be made from laminating or co-extruding differing materials in order to obtain the required blend of properties. The elastic sleeve may be of circular cross-section but is not limited thereto. The elastic sleeve may be, for instance, oval in cross-section. The elastic sleeves in accordance with the invention are typically medium walled tubes. Typical unstretched sleeve inner diameters lie in the range 5 to 80 mm, preferably 5 to 50 mm, and unstretched tube thicknesses in the range 1 to 7 mm, preferably 1 to 4 mm whereby the thicker tubes are generally used for the larger diameters. In all the embodiments of the invention the elastic sleeve is supported on a support in a radially stretched condition. It is preferred if the expansion ratio of the elastic sleeve on the support compared with its recovered diameter is as high as possible without risking splitting of the sleeve or excessive permanent set. It is preferred if the expansion ratio is at least 3 to 1. This is achievable with preferred materials such as EPDM and silicone rubber. Where reference is made in this application to highly expanded or highly stretched with reference to the elastic sleeve, it is understood that the expansion ratio is 3 to 1 or greater.

The support may be made from any suitable material which can withstand the compressive forces generated by the highly expanded elastic sleeve without deformation, fracturing or collapsing. Depending upon the application the support may be a permanent support that is insulating or conductive. Suitable materials for such a permanent support may be plastics such as polyvinylchloride (PVC), polyethylene or polypropylene, thermosetting plastics such as epoxies, metals such as aluminum, steel or copper, ceramics or similar. The permanent support may be hollow having one or more open ends, or may be solid as required by the application. The permanent support may be generally circular or tubular or oval or polygonal e.g. hexagonal in shape. The permanent support may include electronic circuitry or be suitable for attaching to other equipment.

Alternatively, the support may be temporary. Suitable materials for a temporary support core may thermoplastic materials such as polyolefin resins and modified PPO (polyphenylene oxide) resin A temporary support core may be, for example, a removable support core such as a cylindrical support composed of a spirally wound ribbon. Such a support may be prepared by integrally forming a plastic ribbon into a spiral shape to provide a cylindrical body. The cylindrical support body may also be formed by another method in which the external surface of a hollow cylinder is spirally grooved, perforated, or otherwise weakened to form a continuous spiral ribbon. Either of these types of supports can be unwrapped by successively unfastening one spiral ribbon portion from the next adjacent spiral ribbon portion. The temporary support core could alternatively be, for example, a removable support core such as a cylindrical slide-out support that operates as a single unitary member that can slide out from the cold shrinkable material or a crushable support core such as a frangible support that is not to be removed from the cold shrinkable material.

As shown in prior art FIG. 1, a covering device 10 includes an elastic sleeve 12 as described above supported on a support 16 in a highly stretched radially expanded state. Outer portions 13, 14 of the elastic sleeve 12 are folded back onto the sleeve 12. The support 16 extends through the sleeve 12. Optionally, the support 16 may also extend beyond the folded elastic sleeve 12 such that outer ends 18 and 19 are exposed. The covering device 10 is slid over an elongate object 1 to be covered, such as a cable or cable joint. The support 16 may be removed, or left in place, when the folded back outer portions 13, 14 of sleeve 12 are unfolded, respectively, in the direction of the arrows shown above each outer portion such that they cover a portion of elongate object 1. It is generally not possible to slide the outer portions 13, 14 over the inner portion of the elastic sleeve 12 without some form of friction reducing means because the compressive forces between the layers are high.

In prior art embodiments, such as that shown in FIG. 1, a lubricating material such as a silicone grease may be applied between folded back outer portions 13,14 and the portion of sleeve 12 over which they are folded to make unfolding outer portions 13,14 easier. Unfolding the outer portions typically consists of pushing or pulling the outer portions in the direction of the arrows above each outer portion such that the outer sections unroll and the exposed surfaces of outer sections 13, 14 in FIG. 1 end up facing toward support 16. A disadvantage of this embodiment is that after the outer portions have been unfolded, the outer layer of sleeve 12 is covered with grease, which makes handling the sleeve messy and difficult.

Embodiments of the present invention overcome this issue by enclosing a low friction material such as silicon grease within a low friction sleeve that encompasses the portion of sleeve 12 underneath folded back outer portions 13, 14. The low friction sleeve of the present invention increases the ease with which the outer portions 13, 14 can be unfolded or unrolled. In at least one embodiment of the present invention, the portion of the outer surface of the low friction sleeve in contact with outer portion 13 or 14 will remain in contact with essentially the same area of outer portion 13 or 14 as outer portions 13, 14 are pushed or pulled toward ends 18 and 19 of support 16 while the inner surfaces of the low friction sleeve, which are at least partially covered by a low friction material will slide against each other. In this manner, the movement of the low friction sleeve walls and outer portions 13, 14 are akin to a conveyor belt (low friction sleeve) moving an object on the conveyor belt (outer portions 13,14) except that the low friction sleeve is not stationary like a conveyor belt, but moved akin to tank tracks.

Figure 2A:
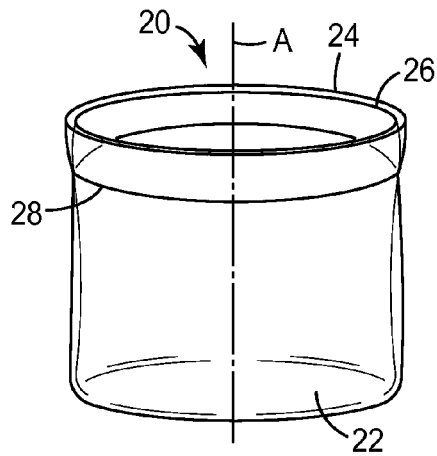
FIGS. 2a-2f depict various embodiments of the low friction sleeve of the present invention.
Figure 2B:
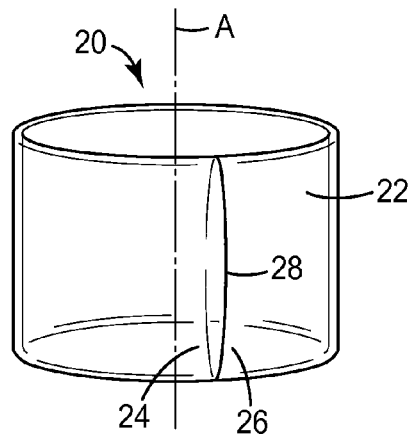
Figure 2C:
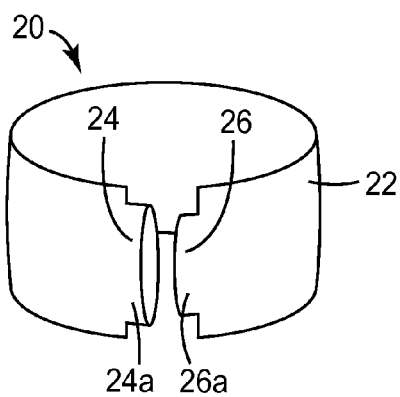
Figure 2D:
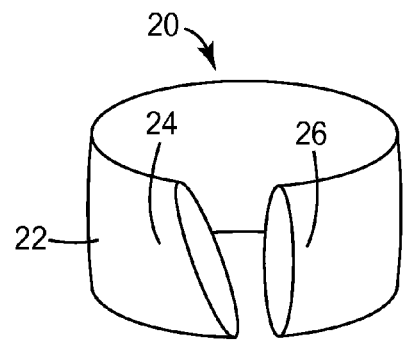
Figure 2E:
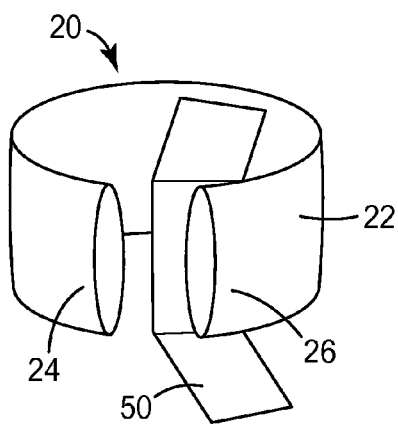
Figure 2F:
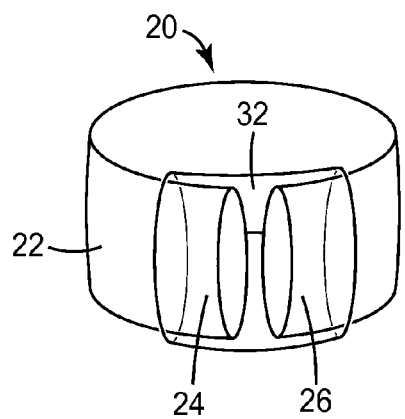

FIGS. 2a-2f illustrate examples of different embodiments of a low friction sleeve 20 of the present invention. Embodiments of the low friction sleeve of the present invention provide a flexible tube having an inner surface, an outer surface, a first end and a second end, the inner surface at least partially covered with a low friction material. Flexible generally means that tube is capable of being flattened such that opposing portions of the inner surface of the tube, or the coatings thereon, touch each other. Typically a substantial area of opposing portions, or the coating thereon, will touch each other. FIG. 2a illustrates an embodiment of the low friction sleeve 20 of the present invention in which the tube 22 is folded over on itself such that first end 24 and second end 26 of the tube 22 are adjacent to each other thereby forming a shorter, double walled tube. A low friction material (not shown) may then be deposited between the double walls of the tube and the tube ends may be sealed together to prevent the low friction material from escaping. The tube ends 24,26 may be sealed in any suitable manner such as with an adhesive, including a hot melt adhesive or a pressure sensitive adhesive; a tape such as a double sided tape, by heat sealing the tube ends together, etc. In some embodiments, prior to sealing the tube ends, air may be removed from the enclosed space such as by applying a vacuum before the enclosed space is fully sealed. As can be seen in FIGS. 2a and 2b, when the tube 22 is sealed it forms a closed tube. In the embodiment of FIG. 2a, the seal forms a seam 28 perpendicular to the longitudinal axis A of the closed tube. In the embodiment of FIG. 2b, tube ends 24, 26 are sealed together without folding the tube first, such that the seal forms a seam 28 parallel to the longitudinal axis A of the closed tube. FIGS. 2c-2f illustrate embodiments of the low friction sleeve 20 in which the tube 22 is not sealed. In these embodiments, at least some portion of the tube ends 24, 26 overlap or are attached to each other and the low friction material is preferably a highly viscous material that will not readily leak from the unsealed ends of the tube. In the embodiment illustrated in FIG. 2c one end (26) of the tube includes a protrusion 26a and the other end (24) of the tube includes a receptacle 24a for receiving the protrusion. In the embodiment of FIG. 2d, one end of the tube (24) is angled or slanted such that it can easily be inserted inside the other end (26) of the tube. In the embodiment of FIG. 2e, the tube ends 24, 26 are joined together by tape 30. In the embodiment of FIG. 2f, one end of the tube is held in close proximity to the other end of the tube by a secondary sleeve 32 that encircles both ends 24, 26 of the tube 22. In other embodiments (not shown) the tube ends 24, 26 are not overlapped or attached to each other. The ends 24, 26 may abut each other or may be further apart from each other. As with the unsealed embodiments, and the low friction material is preferably a highly viscous material that will not readily leak from the ends of the tube.

The tube may be made of any type of suitable material such as heat sealable thermoplastics, thermoplastic elastomers, and elastomers. Particularly suitable materials include, but are not limited to, polyethylene, polypropylene, butyl rubber, silicone, and EPDM.

In some embodiments, it is preferred that the walls of the tube are thin, e.g., about 0.01 to 0.10 mm and in some embodiments about so that the low friction sleeve is very flexible. In some embodiments, it is preferred that the walls of the tube are made of a high friction material. "High friction material" means a material that has a higher friction than the low friction material and will typically not slide against the surface of sleeve 12 or will slide against it much less easily than it will slide against the low friction material.

The low friction sleeve may fit snugly or loosely around sleeve 12. It may fit completely under the folded back portions 13, 14 of sleeve 12 or may extend out from under the folded back portions 13, 14.

The low friction material may be any material that causes the inner walls of the tube to slide against each other. It may be in the form of fluids, particulates, films, or a combination thereof. Particularly suitable fluid materials include, but are not limited to, a surfactant, a soap, a grease such as silicone grease, a thixotropic oil, pressurized gas, a lubricating gel, a lubricating paste, a lubricating polymer, a synthetic lubricant, a vegetable oil or lubricant, a mineral oil or lubricant, and combinations thereof. Particularly suitable particulate materials include, but are not limited to, talc, graphite or graphite powder, carbon black, glass beads, microspheres or microbeads, ball bearings, and combinations thereof. Particularly suitable film materials include, but are not limited to, polytetrafluoroethylene such as TEFLON, available from DuPont, silicone polymers, polyethylene, and polypropylene, and combinations thereof. The film materials may be permanently attached to the inside walls of the tube by any suitable method such as coating or co-extrusion.

Any suitable amount of low friction material may be used. In some embodiments, it may be preferable to use a small amount of low friction material and in other embodiments it may be preferable to use a large amount. In some embodiments, it is preferable that all inner surfaces of the tube are covered with a low friction material. The low friction material should be stable over long periods of time at normal storage temperatures and remain lubricating without degrading the tube or itself being degraded by the tube material. It is preferable that the low friction material is inert with respect to, or incompatible with, the materials used for the tube walls in order to avoid intermixing or cross-diffusion of materials or components thereof.

Figure 3A:
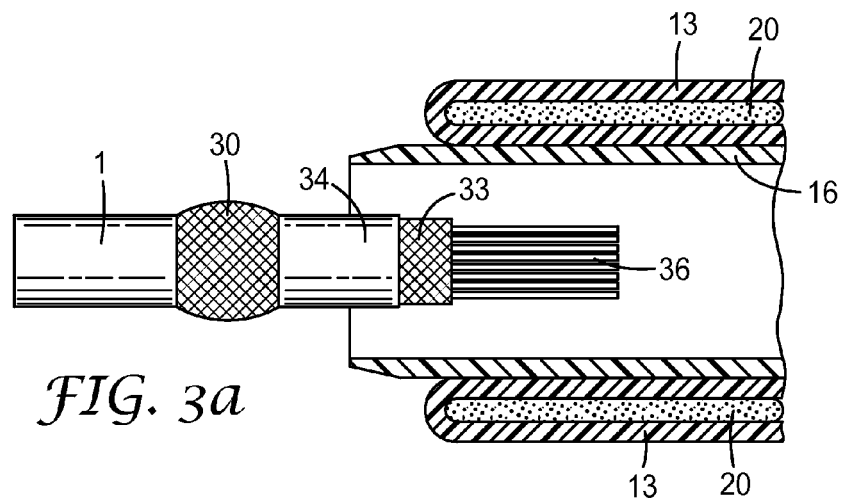
FIGS. 3a-3e depict a cold shrink device being installed using an embodiment of a low friction sleeve of the present invention.
Figure 3B:
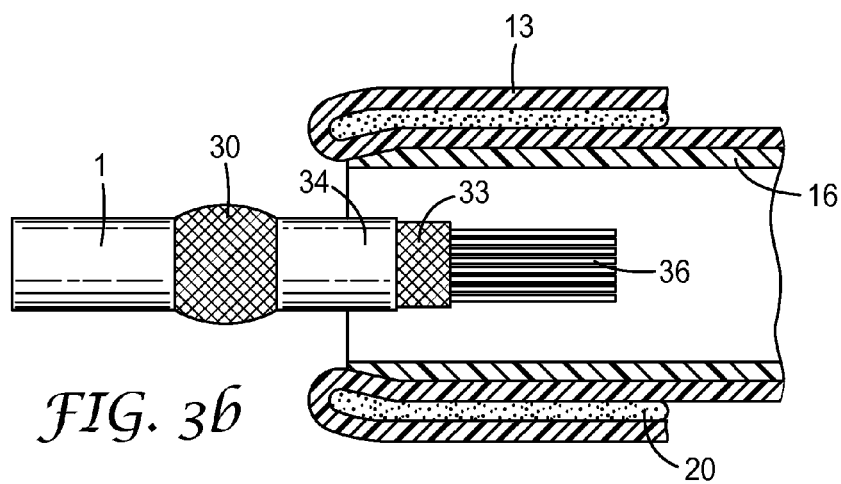
Figure 3C:
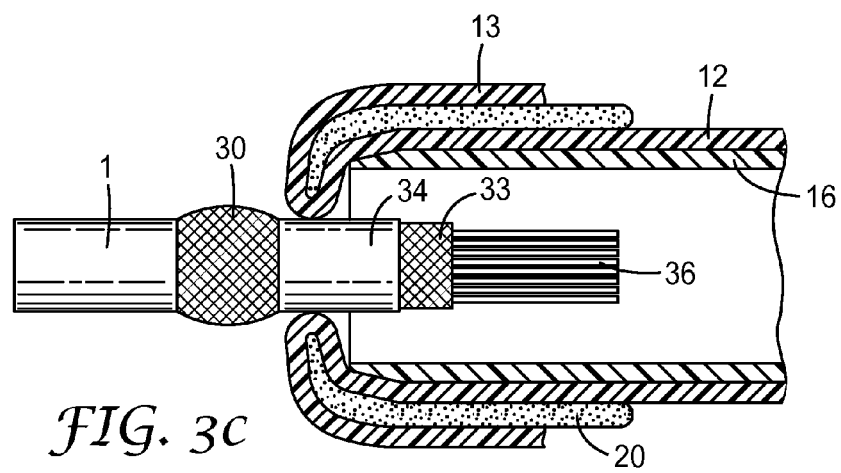
Figure 3D:
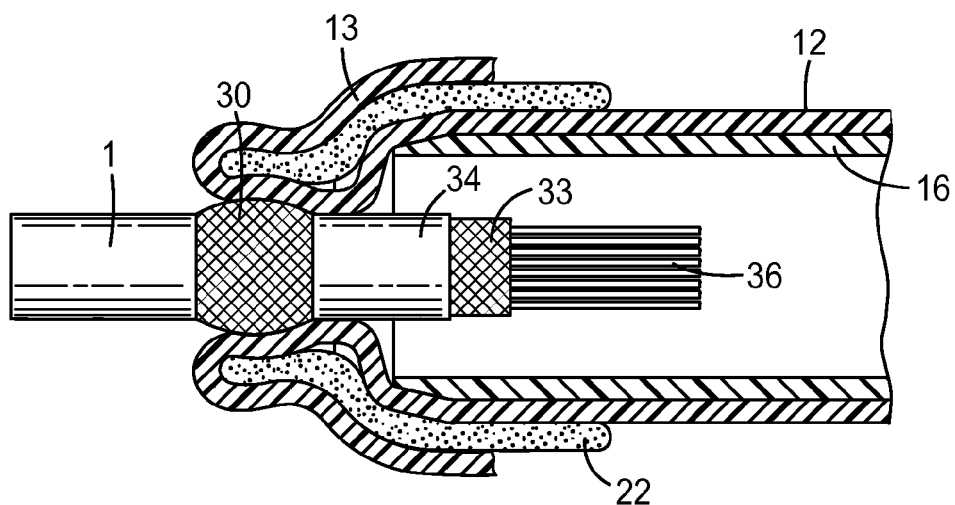
Figure 3E:
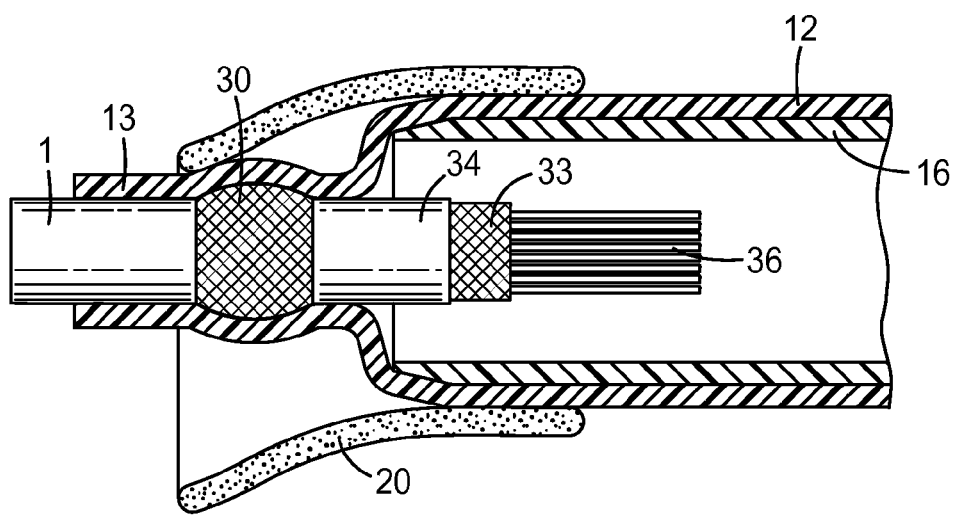

FIGS. 3a-3e illustrate an outer portion 13 of sleeve 12 being unfolded over a permanent support 16 onto elongate object 1 with the aid of low friction sleeve 20 of the present invention. In FIGS. 3a-3e, elongate object 1 is a cable including one or more insulated conductors 36, a screen 33, and an outer jacket 34 and sealing material 30. Typically the cable would be joined to another cable by a connector (not shown) within permanent support 16. To install the cover 10, the outer sleeve portions 13 and 14 are moved longitudinally away from the center of the cover 10 by sliding the outer portions 13, 14 progressively outward over the underlying elastic sleeve 12 until the outer sleeve portions 13 and 14 have completely left the support 16 and conforms to the elongate object 1 as shown in FIG. 3e. As the outer sleeve portions 13, 14 are moved longitudinally they pull the upper outer surface of low friction sleeve 20 along with them. In some embodiments, the upper outer surface of low friction sleeve 20 may be adhered to outer sleeve portions 13, 14, such as with a spray adhesive, a tape, or the like, to ensure that the low friction sleeve moves with the sleeve portions as they are unrolled. Because the inner surfaces of the low friction sleeve are at least partially covered with low friction material, the upper inner surface of the low friction sleeve easily slides over the lower inner surface of the low friction sleeve. This low interlayer friction between the two inner layers of low friction sleeve 20 results in outer sleeve portions 13, 14 easily sliding off of sleeve 12.

Figure 4:
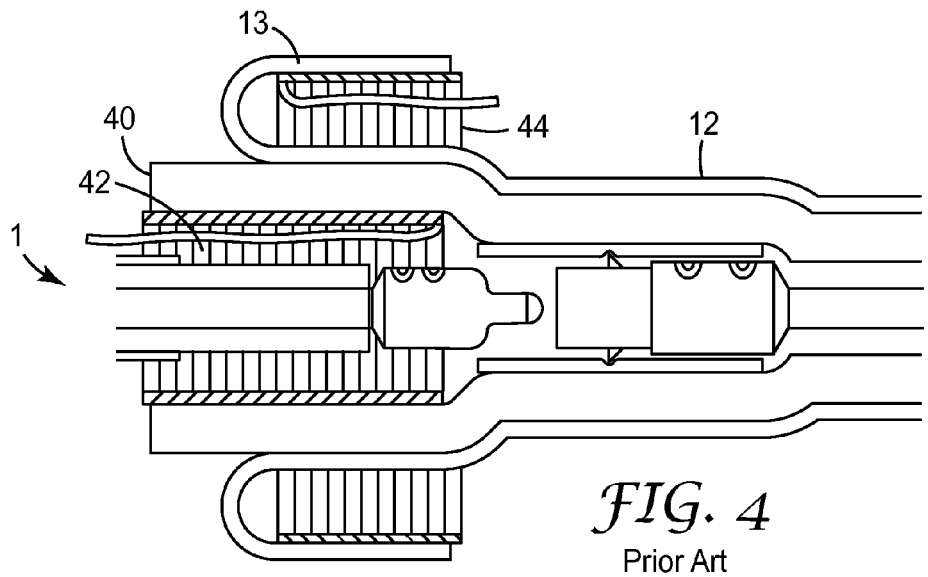
FIG. 4 depicts a prior art cold shrink device.

FIG. 4 illustrates another prior art embodiment of the application of a cold shrink article. The article of FIG. 4 includes an elongate article, which includes two cables being joined by plug and socket connectors. The socket connector and the cable to which it is attached are surrounded by a cold shrink stress tube 40 (individual layers not shown) and sleeve 12, both of which are shrunk down around the cable and connector. Portions of cold shrink stress tube 40 and sleeve 12 are held in an expanded state by removable support cores 42 and 44, respectively, to allow the plug connector and the cable to which it is attached to be mated with the socket connector. After the connectors are mated, support core 42 is removed, thereby allowing stress tube 40 to shrink down, then support core 44 is removed as outer portion 13 is unfolded over stress tube 40.

Figure 5A:
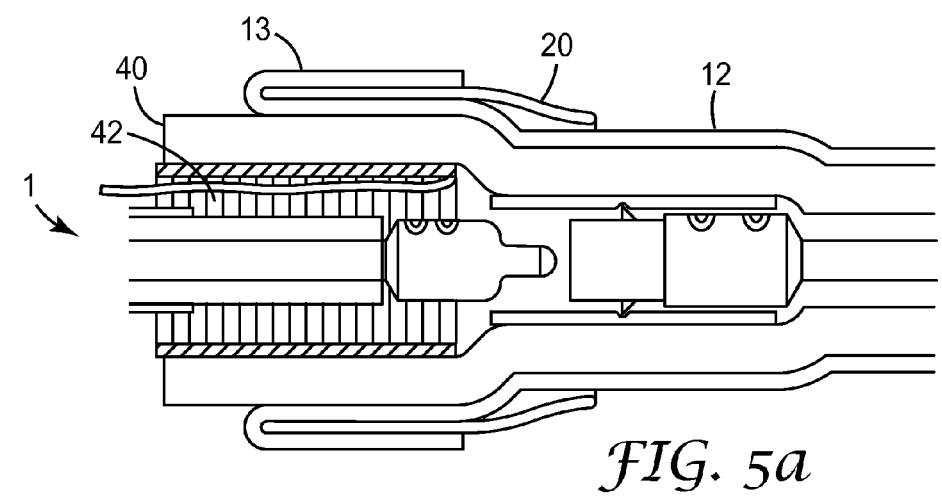
FIGS. 5a-5b depict a cold shrink device being installed using an embodiment of a low friction sleeve of the present invention.
Figure 5B:
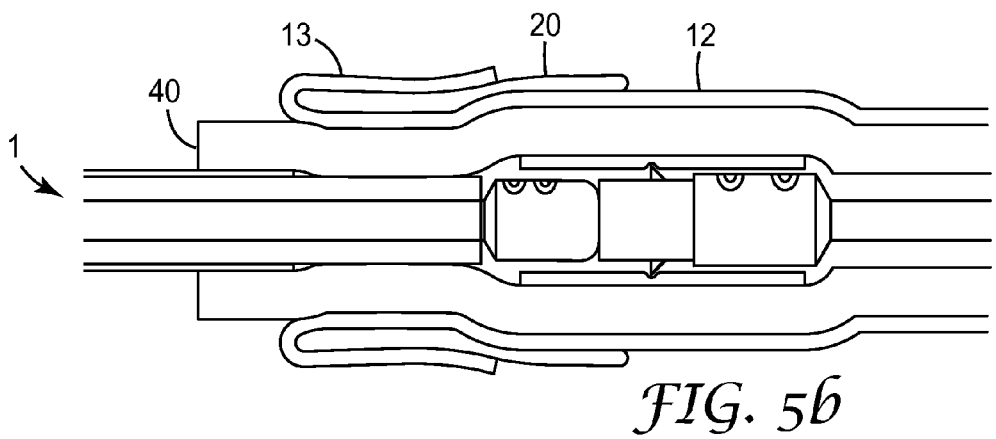

FIGS. 5a and 5b illustrate how the present invention dispenses with the need for support core 44, thereby providing a cold shrink article having a smaller diameter and having one less support core that needs to be loaded onto and removed from the article. As illustrated in FIG. 5a, instead of outer portion 13 being folded back over support core 44, it is folded back over low friction sleeve 20. FIG. 5b illustrates the cold shrink article after support core 42 has been removed and stress control tube 40 has been shrunk down around the cable. At this point, outer portion 13 can be slid over the outer surface of sleeve 12 with the aid of low friction sleeve 20, as previously described.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. This application is intended to cover any adaptations or variations of the preferred embodiments discussed herein. Therefore, it is manifestly intended that this invention be limited only by the claims and the equivalents thereof.

What is claimed is:

1. An article comprising:
a cold shrinkable sleeve disposed on a tubular support core in a stretched condition, at least a portion of the cold shrinkable sleeve folded such that at least one portion of the cold shrinkable sleeve overlaps another portion of the cold shrinkable sleeve, wherein a flexible tube is positioned between the overlapping portions of the cold shrinkable sleeve, the flexible tube comprising an inner surface, an outer surface, a first end and a second end, the inner surface at least partially covered with a low friction material.

2. The article of claim 1 wherein the first and second ends of the tube are joined to form a closed tube.

3. The article of claim 2 wherein the first and second ends of the tube are heat sealed to each other.

4. The article of claim 3 wherein the heat seal forms a seam perpendicular to the longitudinal axis of the closed tube.

5. The article of claim 3 wherein the heat seal forms a seam parallel to the longitudinal axis of the closed tube.

6. The article of claim 2 wherein the first and second ends of the tube are taped together.

7. The article of claim 1 wherein the flexible tube comprises one or more materials selected from the group consisting of heat sealable thermoplastics, thermoplastic elastomers, and elastomers.

8. The article of claim 7 wherein the flexible tube comprises one or more materials selected from the group consisting of polyethylene, polypropylene, butyl rubber, silicone, and EPDM.

9. The article of claim 1 wherein the low friction material is selected from the group consisting of fluids, particulates, films or a combination thereof.

10. The article of claim 9 wherein the fluid comprises one or more of a surfactant, a soap, a grease, a thixotropic oil, pressurized gas, a lubricating gel, a lubricating paste, a lubricating polymer, a synthetic lubricant, a vegetable oil or lubricant, a mineral oil or lubricant, and combinations thereof.

11. The article of claim 10 wherein the thixotropic oil is silicone oil.

12. The article of claim 9 wherein the particulate comprises one or more of talc, graphite or graphite powder, carbon black, glass beads, microspheres or microbeads, ball bearings, and combinations thereof.

13. The article of claim 1 wherein the low friction material is a film that is permanently adhered to the inner surface of the flexible tube.

14. The article of claim 13 wherein the low friction material is selected from the group consisting of polytetrafluoroethylene, silicone polymers, polyethylene, and polypropylene.

15. The article of claim 1 wherein the flexible tube comprises a high friction material.

16. The article of claim 15 wherein the high friction material is selected from the group consisting of thermoplastics, thermoelastomers, and elastomers.

* * * * *

UNITED STATES PATENT AND TRADEMARK OFFICE
CERTIFICATE OF CORRECTION

| | | |
|---|---|---|
| PATENT NO. | : 9,136,687 B2 | Page 1 of 1 |
| APPLICATION NO. | : 13/715594 | |
| DATED | : September 15, 2015 | |
| INVENTOR(S) | : Kevin Gassaway | |

It is certified that error appears in the above-identified patent and that said Letters Patent is hereby corrected as shown below:

Column 1
Line 8, Delete "Dec. 20, 2012" and insert -- Dec. 20, 2011. --, therefor.

Column 3
Line 18, Delete "epichlorhydrin" and insert -- epichlorohydrin --, therefor.

Signed and Sealed this
Seventeenth Day of May, 2016

Michelle K. Lee
*Director of the United States Patent and Trademark Office*